Aug. 14, 1962 W. M. CABRAL 3,049,253
AIRPLANE TOW TRACTOR
Filed June 9, 1959 4 Sheets-Sheet 4
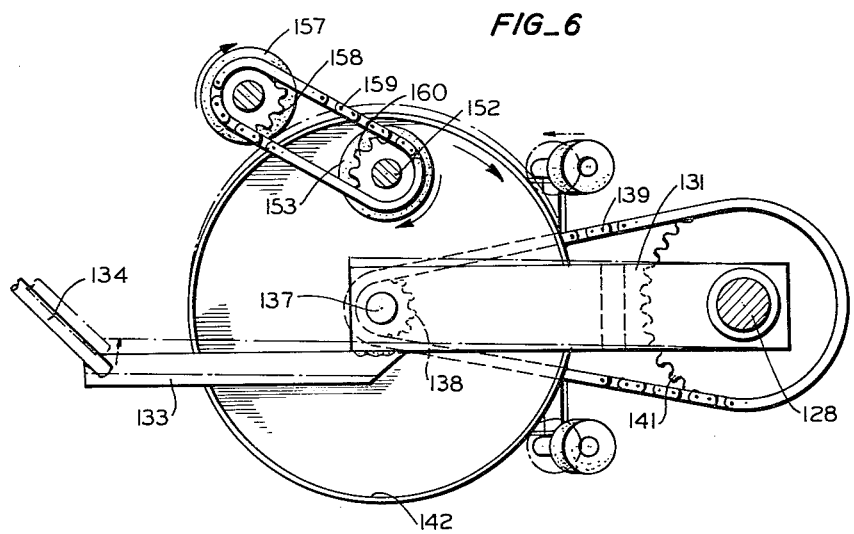
FIG_6
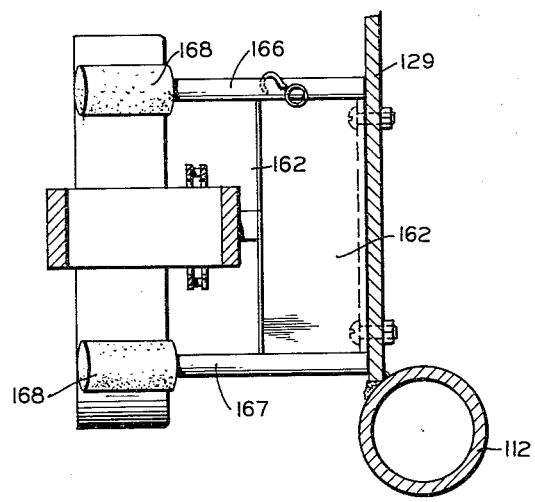
FIG_7
INVENTOR.
WALTER M. CABRAL
BY
*Lothrop & West*
ATTORNEYS

# United States Patent Office 3,049,253
Patented Aug. 14, 1962

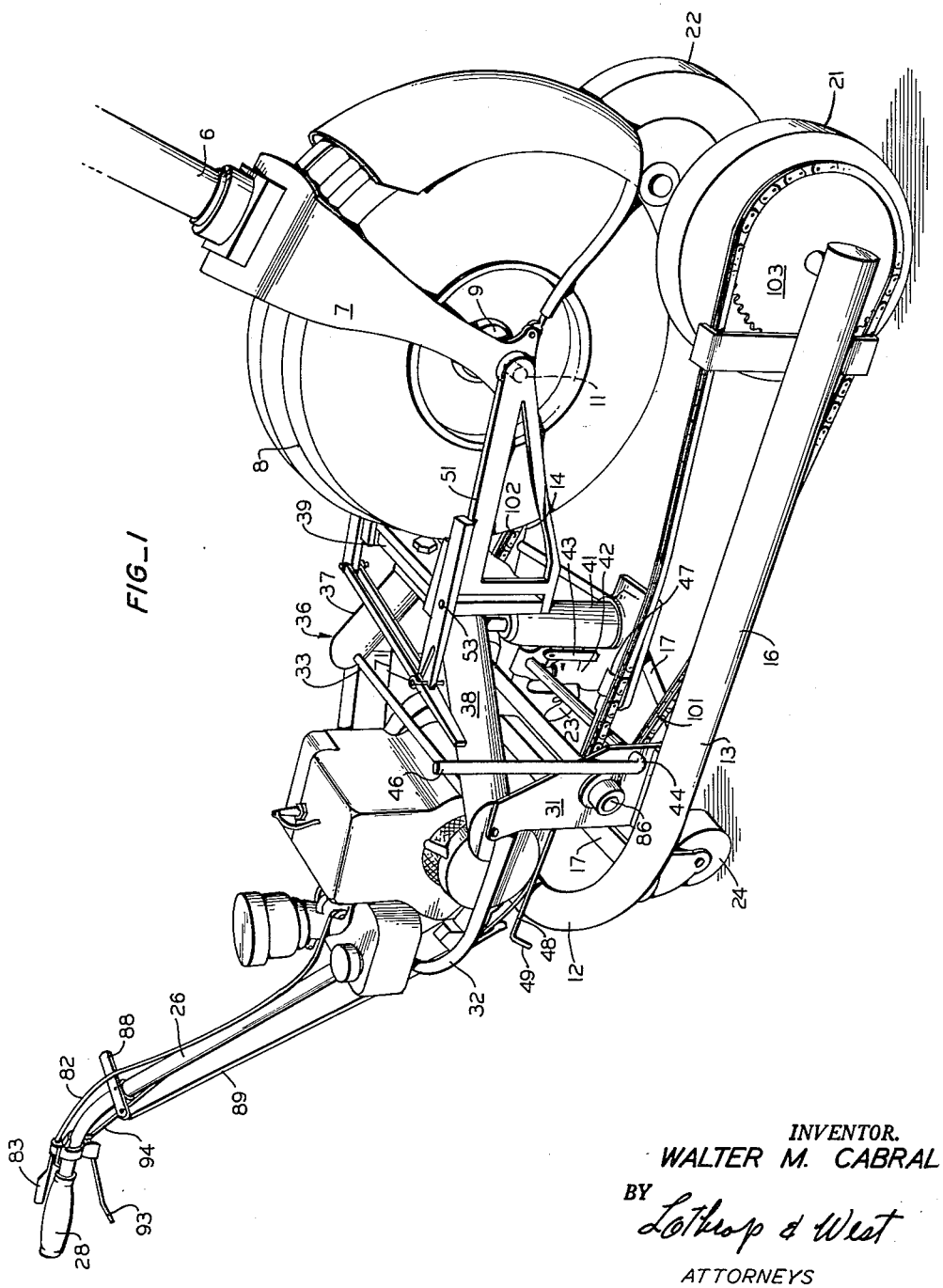

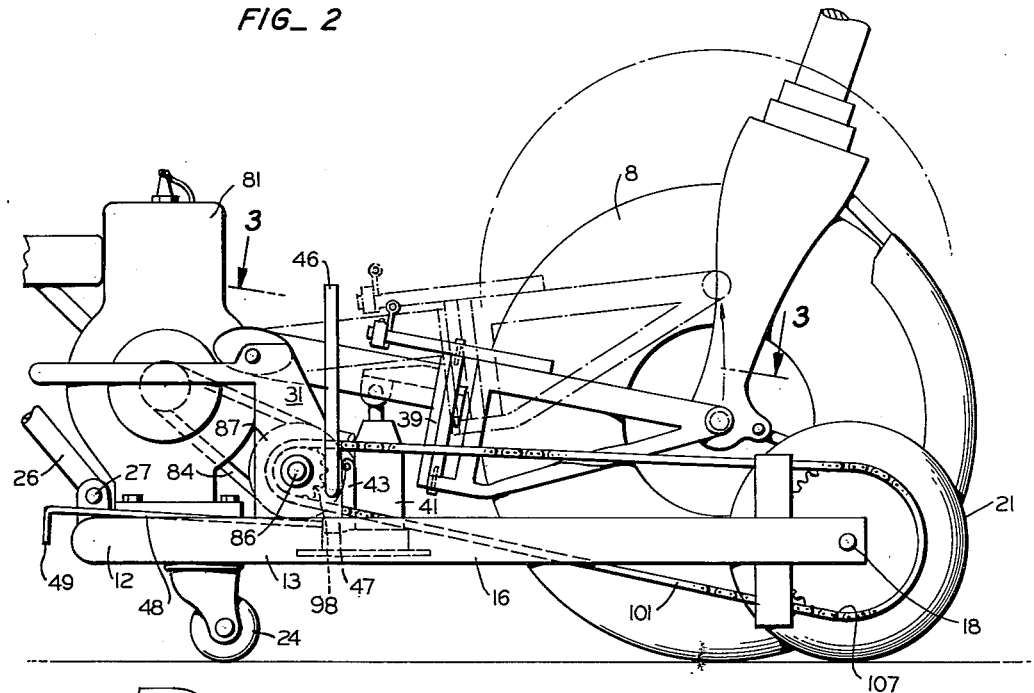

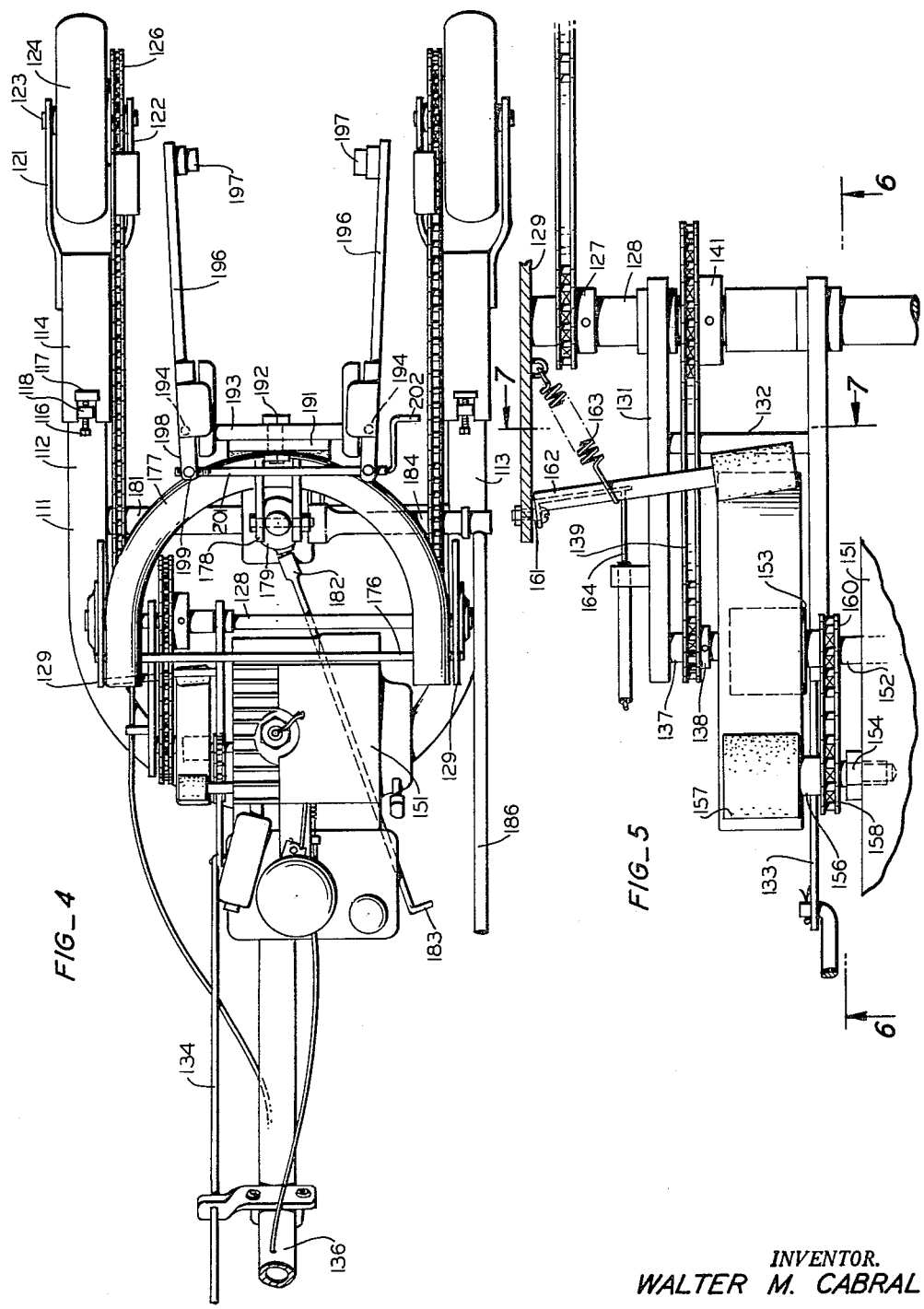

3,049,253
AIRPLANE TOW TRACTOR
Walter M. Cabral, Santa Clara, Calif., assignor to Yuba Consolidated Industries, Inc., a corporation
Filed June 9, 1959, Ser. No. 819,183
1 Claim. (Cl. 214—147)

My invention relates to means especially useful in moving airplanes about the hangar and is particularly concerned with a self-propelled mechanism maneuverable by an operator and effective to handle an airplane, particularly an airplane with a tricycle landing gear, so that it is easily maneuvered, especially in and around the hangar area.

At the present time, the manipulation of personal airplanes is relatively awkward and difficult and sometimes involves large amounts of manual effort. Also, some of the hangars presently available have openings or doorways sufficiently low so that the after portion of some airplanes must be depressed in order to permit passage of the airplane into and out of the hangar.

It is therefore an object of the invention to provide an airplane tow tractor with which an operator can easily move a personal airplane out of and into a hangar, effectuating all of the maneuvers necessary and desirable and with the expenditure of only a small amount of manual effort but maintaining the airplane under control at all times.

Another object of the invention is to provide a relatively simple and cheap airplane tow tractor which can be utilized with a large number of individually different airplanes.

A still further object of the invention is to provide an airplane tow tractor usable by one man and so arranged in connection with the airplane that the combined mechanism is under close and safe control at all times.

A still further object of the invention is to provide an airplane tow tractor effective to change the attitude of the airplane during towing.

A still further object of the invention is, in general, to provide an improved airplane tow tractor.

Other objects, together with the foregoing, are attained in the embodiments of the invention described in the accompanying description and illustrated in the accompanying drawings, in which:

FIGURE 1 is a perspective view of one form of an airplane tow tractor constructed in accordance with the invention and in engagement with the nose wheel of an airplane being towed.

FIGURE 2 is a side elevation of the structure shown in FIGURE 1, certain portions being broken away to reduce the size of the showing.

FIGURE 3 is a diagrammatic plan showing a part of the mechanism of FIGURE 2.

FIGURE 4 is a plan showing another form of airplane tow tractor, portions being broken away.

FIGURE 5 is a plan, with portions in section and portions broken away, showing part of the power transmission mechanism.

FIGURE 6 is a cross-section, the plane of which is indicated by the line 6—6 of FIGURE 5.

FIGURE 7 is a cross-section, the plane of which is indicated by the line 7—7 of FIGURE 5.

The airplane tow tractor illustrated and described herein has been successfully embodied in both of the variant forms disclosed. It is especially for use with an airplane, such as a personal airplane, having a tricycle landing gear including a front strut 6 provided with a fork 7 on which the nose wheel 8 is mounted by means of an axle 9 having projecting axle ends 11. The strut 6 is usually mounted in the airplane in such a fashion that the strut 6 can be rotated about its inclined, longitudinal axis in order that the wheel 8 may be steered.

Pursuant to the invention, there is provided for use with the airplane a tow tractor including a main frame 12. This is a fabricated structure preferably made up of suitable standard shapes. In the present instance, it includes a tube base 13 formed as a U-shape in plan to provide a pair of side beams 14 and 16. The main frame 12 is substantially parallel to the ground and is provided with appropriate rearward and forward cross members 17.

Since the vehicle is substantially symmetrical in many respects, a description of one side is equally descriptive of the other. At its forward end, the side beam 16, for example, carries a transversely extending stub axle 18 on which is rotatably mounted a ground-engaging wheel equipped with a pneumatic rubber tire 21. The other side beam 14 is similarly equipped with a wheel and tire 22. The tires 21 and 22 are mounted for rotation about a common transverse axis with respect to the frame 12 but are spaced far enough apart so that the airplane wheel 8 easily can be accommodated between them, as seen in FIGURES 1, 2 and 3. The weight on the rearward portion of the frame 12 is supported on a pair of ground-engaging caster wheels 23 and 24.

The wheel-supported frame is readily maneuverable by hand. For this reason, there is provided a handle 26 connected by a transverse pivot 27 to the rearmost portion of the main frame 12 and extending upwardly and rearwardly to a hand grip 28 at a convenient height. By grasping the hand grip 28, an operator can readily maneuver the main frame to any desired position, particularly a position with the wheels 21 and 22 on opposite sides of an airplane wheel 8.

Upstanding from the side beams 14 and 16 of the main frame are plates 29 and 31 connected by a U-shape rearward brace 32 and spanned by a cross-shaft 33. Pivotally related to the main frame and to the plates 29 and 31 by the cross-shaft 33 is a lift frame 36. This frame includes a pair of side tubes 37 and 38 converging forwardly and joined to a mounting plate 39. A hydraulic jack 41 rests on the forward cross member 17 and is in engagement at its upper end with the mounting plate 39.

The jack 41 is a standard unit and is operated by a pump 42 actuated through a link 43 by means of a cross rod 44 journalled in the plate 31 and at its outer end upstanding to provide an operating lever 46. A control valve 47 is also included in the jack structure and is readily manipulated by a rod 48 having a handle 49 on the end thereof. When the valve 47 is in one position, the lever 46 can be oscillated back and forth to operate the pump 42 and to extend the jack 41, thus raising the lift frame 36 about the shaft 33 as an axis. When the valve 47 is put into another position by appropriate manipulation of the handle 49, the jack is blocked in any selected position and thus holds the lift frame in a set position. When the valve 47 is opened, the jack 41 is permitted to descend under the load imposed upon it so that the lift frame 36 is lowered.

In accordance with the invention, means are provided on the lift frame for positively engaging the airplane wheel structure when it is disposed between the ground-engaging wheels 21 and 22. At its forward end and on each side, the lift frame 36 is provided with grip arms 51 and 52. These at their forward portions are triangularly braced members and are mounted by vertical pivot pins 53 and 54 on a plate 55 pivoted by a longitudinal pin 56 to the plate 39 and so are included with the lift frame. The forward extremities of the grip arms are provided with grip cups 57 of appropriate size and shape readily to fit over the axle extensions 11 of the nose wheel 8. If the axle extensions 11 are not quite horizontal, the plate 55 pivots on the pin 56 with respect to the plate 39 so that the grip cups are properly positioned.

In order that the grip arms can be properly manipulated, they are provided with rearwardly extending portions 58 and 59 connected to a suitable actuator. To the rear end of the portion 58, a lever 61 is connected by a pivot pin 62. Adjacent the portion 59, the lever 61 is provided with a pin 63 which passes through a cam groove 64 in the rearward extension 59 of the grip arm 51. The projecting part of the lever 61 serves as a handle 66.

When the lever 61 is in its foremost position, as shown in FIGURE 3, the pin 63 is in the portion of the cam groove 64 which causes the rearward portions 58 and 59 of the grip arms 51 and 52 to approach each other closely and thus to spread the grip cups 57 to their maximum extent. In this position, the cups can be placed alongside of and in alignment with the axle ends 11. Then, the handle 66 can be pulled rearwardly with the pin 63 riding in the cam slot 64 so that the rearward portions 58 and 59 are spread apart. This brings the grip cups 57 to a close approach and into a position overlying and engaging with the projecting axle ends 11. When the lever 61 is in the rearmost position, a pin 71 is introduced through an opening 72 in the portion 59 and locks the grip cups 57 in axle-engaging location.

After the nose wheel has been so engaged, the jack 41 is actuated to raise it from its lowermost or substantially its lowermost position. The jack in rising lifts the nose wheel 8 off of the ground to a convenient height for towing. The valve 47 is then closed by manipulation of the handle 49 and the nose wheel 8 is effectively blocked or held at a convenient towing location above the ground. The main frame 12 can then be manipulated or maneuvered over the ground. If necessary from time to time, the jack 41 can be actuated either to raise the nose of the plane higher or to drop it lower. As the device is maneuvering a plane into and out of a hangar, it is particularly useful to be able to extend the height of the jack 41 temporarily as the tail section is being moved under the hangar doorway. Lifting the nose wheel 8 depresses the tail surfaces and makes it easier for them to clear the door frame. For normal towing, the nose wheel 8 is maintained at only a short distance above the ground.

In order that considerably more weight can be towed than can be readily pulled manually by the operator, the airplane tow tractor is provided with its own power. Situated on the rear, closed end of the frame 12 is a prime mover 81, such as an internal combustion engine, having a speed control 82 extending up the handle 26 to a convenient operating lever 83. The engine 81 is provided with a drive 84 to a cross-shaft 86, there being interposed in the drive a change speed transmission 87 effective to afford a forward speed, a reverse speed and a neutral position. The change gear box 87 is under the control of an operating lever 88 disposed on the handle 26 and connected by a rod 89 to the gear box.

Also included in the drive is a braking mechanism controlled by a lever 93 operaitng through a flexible line 94.

Near the opposite ends of the cross-shaft 86 are sprockets 98. These are encompassed by drive chains 101 and 102 extending forwardly alongside the side beams 14 and 16 and are also trained around sprockets 103 fastened to the wheels 21 and 22. In this fashion, the driving power of the motor 81 is transmitted either in a forward or in a reverse direction to the two forward ground-engaging wheels. The user, merely by operating the throttle 83 and guiding the handle 26, can maneuver the mechanism forwardly and backwardly in any path desired. Between maneuvers, the engine 81 can be left running by operating the lever 88 to place the change gear in neutral position. While the airplane is parked, the brake control 93 can be utilized and set to hold the entire towing device and the airplane against movement.

When the plane is in a proper position, the jack 41 is manipulated to lower the lift frame 36 until the nose wheel 8 is again firmly in contact with the ground. Then, the pin 71 is removed and the handle 66 is manipulated to withdraw the grip cups 57 from the ends of the wheel axle. The airplane is thus released and the tow tractor can be placed in reverse gear and removed from the vicinity of the plane for use on another occasion.

In the particular form of the invention illustrated in FIGURES 4–7, inclusive, there is provided a tubular, U-shaped main frame 111. The forwardly extending arms 112 and 113 thereof carry notched tubular sleeves 114. These are longitudinally adjustable by means of set screws 116 bearing against stop plates 117 and are prevented from rotating by screw mounting blocks 118. At their forward portions, the sleeves 114 are provided with fork arms 121 and 122 carrying axles 123 for ground-engaging wheels 124. Each of the wheels 124 is suitably driven by a sprocket-engaging drive chain 126 extending to and around an appropriate sprocket 127 on a cross-shaft 128 journalled in upright plates 129 upstanding from the main frame 111.

Pivotally mounted on the rotatable cross-shaft 128 is a driving frame 131 having a cross member 132 joining its two side portions. The frame 131 is provided with a projecting arm 133 controlled by an operating rod 134 extending to a convenient point and mounted on the handle 136. When the rod 134 is appropriately manipulated, the frame 131 is raised and lowered slightly about the axis of the cross-shaft 128 as a center.

Suitably journalled in the frame 131 is a mounting shaft 137 carrying a sprocket 138 around which a chain 139 is trained. The chain 139 also engages a sprocket 141 fast on the cross-shaft 128. A rimmed friction drum 142 is fast on the shaft 137 and hence can be lifted or lowered as the control rod 134 is manipulated, but since the shaft 137 swings arcuately about the axis of the shaft 128, the operation of the chain 139 is substantially the same in all operating positions of the parts.

On a suitable mounting on the frame 111 there is provided a prime mover, such as an internal combustion engine 151, equipped with a projecting driving shaft 152. At the extended end of the shaft 152 is a friction driving roller 153 rotating in unison with the shaft 152 and disposed on the interior of the rim of the drum 142. Mounted on the engine 151 is a stub shaft 154 carrying a rotatable sleeve 156 at one end supporting a friction roller 157 disposed on the exterior of and overlying the rim or flange of the drum 142. Also connected to the sleeve 156 is a sprocket 158 joined by a chain 159 to a sprocket 160 fast on the shaft 152.

With this mechanism, the two friction rollers 153 and 157 rotate always in the same direction and at the speed of the engine 151. The rollers 153 and 157 are disposed so that they are near to but somewhat spaced from the rim of the drum 142. Thus, when the lever 134 is manipulated to lower the drum 142, the interior of the drum rim frictionally engages the roller 153 so that the drum 142 is driven with a speed reduction but in the same direction as the roller 153 and through the various chain linkages turns the wheels 124 accordingly. When the controller 134 is lifted slightly, the drum 142 is in an intermediate position out of frictional engagement with either of the rollers 153 and 157 so that no force is transmitted from the rollers to the drum and the device is in neutral position.

When the controller 134 is lifted farther, the drum 142 is lifted into frictional engagement with the roller 157. Since the direction of the roller 157 is the same as that of the roller 153 but since the outside of the drum 142 rather than its inside is now engaged, the drum 142 revolves in an opposite direction and through the chain mechanism drives the wheels 124 in a reverse direction. Thus, when the engine 151 is operating, appropriate manipulation of the rod 134 effects a frictional clutching action and a friction drive to propel the wheels 124 either forwardly or in a reverse direction or leaves them without drive in an unclutched, neutral position all under the control and supervision of the operator.

Braking means are additionally provided. Mounted on the frame plate 129 by relatively loose connections 161 is a swinging plate 162 normally held in retracted position by a coil spring 163 which not only engages the plate 162 but also engages the upright bracket 129. The swinging plate 162, however, is movable by means of a flexible wire controller 164 so that it can be moved from a retracted, ineffective position into an advanced position in which arms 166 and 167 projecting from the plate 162 are urged toward the external surface of the drum 142. Friction shoes 168 on the ends of the arms 166 and 167 are effective to cause substantial frictional engagement and an effective braking action. Thus, upon manipulation of the brake control cable 164, the friction shoes 168 are held as firmly as desired against the drum 142. The shoes serve either as retarding devices or, when the mechanism is stationary, serve also as a locking brake.

In a fashion similar to the other form of the mechanism, the upstanding plates 129 are provided with a cross-shaft 176 serving as a pivotal support for a lift frame 177. This frame is conveniently a suitably curved section of tubing which near its center is provided with a bracket 178 engaged by a hydraulic jack 179 resting on a cross tube 181 forming part of the main frame 111. The jack 179 has a control valve 182 manipulated by a lever handle 183 and actuated through a cross tube 184 by a lever 186. The jack functions as previously described.

The lift frame 177 adjacent the bracket 178 also carries a mounting plate 191 from which a longitudinal pivot pin 192 projects to serve as the mounting for a pivot plate 193. At its opposite ends, the pivot plate is provided with vertical pivot pins 194 carrying arms 196 with grip cups 197 thereon. The rearward ends 198 of the arms 196 are provided with threaded pivot pins 199 in which a screw shaft 201 is engaged. A handle 202 affords ready manipulation of the screw shaft. This shaft 201 is preferably provided with opposite handed threads to engage the screw pins 199. By rotation of the crank 202, the operator can cause the cups 197 to approach each other or to recede from each other in an appropriate fashion to engage the axle ends of the nose wheel of the airplane.

The operation of the form of device shown in FIGURES 4–7 is the same as that of the FIGURE 1–3 device.

What is claimed is:

An airplane tow tractor comprising a main frame U-shape in plan and including a pair of forwardly extending side beams, ground-engaging non-dirigible wheels mounted respectively at the forward end of said side beams, ground-engaging caster wheels mounted at the rearward end of said main frame, a handle, means for connecting said handle to the rearward portion of said main frame for pivotal movement relative thereto about a horizontal axis only, side plates upstanding from said side beams adjacent the rearward portion of said main frame, a transverse shaft engaging the upper portion of said side plates, a forwardly converging lift frame at its rearward end engaging said transverse shaft for swinging movement about said shaft relative to said main frame, a vertically and transversely extending mounting plate mounted on the forward central portion of said lift frame, a cross member connected to said side beams, a hydraulic jack abutting said cross member and said lift frame, a vertically and transversely extending pivot plate abutting said mounting plate, a longitudinally extending pivot pin connecting said pivot plate to said mounting plate, grip arms, means including vertically extending pivot pins for mounting said grip arms on said pivot plate and for free transverse swinging movement of said grip arms relative to said main frame, means extending between and engaging said grip arms through vertical pivot connections for moving said grip arms toward and away from each other, and an operating handle for and movable with said moving means.

References Cited in the file of this patent
UNITED STATES PATENTS

| | | |
|---|---|---|
| 2,252,534 | Trotter | Aug. 12, 1941 |
| 2,874,861 | Arnot | Feb. 24, 1959 |
| 2,877,911 | Arnot | Mar. 17, 1959 |
| 2,919,043 | Sharp | Dec. 29, 1959 |